(12) United States Patent
Kilian et al.

(10) Patent No.: US 9,516,199 B2
(45) Date of Patent: Dec. 6, 2016

(54) CAMERA ASSEMBLY FOR THE EXTRACTION OF IMAGE DEPTH DISCONTINUITY AND METHOD OF USE

(75) Inventors: Krzysztof Kilian, Colorado Springs, CO (US); Vladimir Mazur, Floreat (AU); Hongyin Fan, Mt. Claremont (AU)

(73) Assignee: LynxRail Corporation, Colorado Springs, CO (US)

( * ) Notice: Subject to any disclaimer, the term of this patent is extended or adjusted under 35 U.S.C. 154(b) by 444 days.

(21) Appl. No.: 13/360,440

(22) Filed: Jan. 27, 2012

(65) Prior Publication Data

US 2012/0194665 A1 Aug. 2, 2012

Related U.S. Application Data

(60) Provisional application No. 61/436,800, filed on Jan. 27, 2011.

(51) Int. Cl.
*H04N 7/18* (2006.01)
*H04N 5/222* (2006.01)
*H04N 13/02* (2006.01)

(52) U.S. Cl.
CPC ........ *H04N 5/2226* (2013.01); *H04N 13/0214* (2013.01); *H04N 13/0253* (2013.01); *H04N 13/0257* (2013.01); *H04N 13/0271* (2013.01)

(58) Field of Classification Search
CPC .................................................. H05K 13/08
USPC .......................................................... 348/86
See application file for complete search history.

(56) References Cited

U.S. PATENT DOCUMENTS

| | | | |
|---|---|---|---|
| 4,425,042 A * | 1/1984 | Smith | 356/621 |
| 5,982,493 A * | 11/1999 | Lehnen et al. | 356/613 |
| 6,466,618 B1 * | 10/2002 | Messing | G06T 3/4069 348/42 |
| 6,731,391 B1 * | 5/2004 | Kao et al. | 356/605 |
| 7,423,743 B2 * | 9/2008 | Smets et al. | 356/237.1 |
| 7,634,116 B2 * | 12/2009 | Sato | 382/124 |
| 2003/0095406 A1 | 5/2003 | Lebens et al. | |
| 2003/0206650 A1 | 11/2003 | Gladnick | |
| 2004/0212725 A1 | 10/2004 | Raskar et al. | |
| 2005/0134846 A1 * | 6/2005 | Kreh et al. | 356/337 |
| 2005/0200918 A1 | 9/2005 | Muller et al. | |
| 2007/0047980 A1 | 3/2007 | Limer et al. | |
| 2009/0033910 A1 | 2/2009 | Elie et al. | |

(Continued)

FOREIGN PATENT DOCUMENTS

EP 2223650 A1 9/2010

OTHER PUBLICATIONS

International Search Report and Written Opinion of the International Searching Authority, PCT/US2012/22979.

(Continued)

*Primary Examiner* — Leron Beck
(74) *Attorney, Agent, or Firm* — Boardman & Clark LLP

(57) ABSTRACT

A machine vision system is provided. The machine vision system includes a camera. A first flash unit is in communication with the camera and adapted to emit light or a first range of wavelengths in synchronization with operation of the camera. A second flash unit is in communication with the camera and adapted to emit light of a second range of wavelengths in synchronization with operation of the camera. The light of the first range of wavelengths does not overlap the wavelength of the light of the second range of wavelengths.

16 Claims, 4 Drawing Sheets

(56) References Cited

U.S. PATENT DOCUMENTS

2012/0014571 A1* 1/2012 Wong et al. .................. 382/128

OTHER PUBLICATIONS

Feris, Rogerio et al., "Dealing with Multi-Scale Depth Changes and Motion in Depth Edge Detection", XIX Brazilian Symposium on Computer Graphics and Image Processing (SIBGRAPI'06), Oct. 8-11, 2006, pp. 3-10.
Wee-Soon, Ching et al., "Concurrent Acquisition and Processing of Multi-Spectral Shadow Information for 3D Computer Vision", Industrial Electronics, Control, and Instrumentation, 1993. Proceedings of the IECON '83, International Conference on Maui, HI, USA Nov. 15-19, 1993, New York, NY USA, IEEE, Nov. 15, 1993, pp. 1736-1741.

* cited by examiner

CAMERA ASSEMBLY FOR THE EXTRACTION OF IMAGE DEPTH DISCONTINUITY AND METHOD OF USE

CROSS-REFERENCE TO RELATED APPLICATIONS

This application claims the benefit of U.S. Provisional Patent Application 61/436,800, entitled "CAMERA ASSEMBLY FOR THE EXTRACTION OF IMAGE DEPTH DISCONTINUITY AND METHOD OF USE," filed Jan. 27, 2011 which is hereby incorporated by reference in its entirety.

FIELD

The present invention relates to image acquisition and analysis systems. The present invention more specifically relates to a camera assembly for the acquisition and detection of image depth discontinuity from shadow-implementing light sources of separate, nonoverlapping wavelengths.

BACKGROUND

Machine vision systems are known for use in industrial applications to acquire an image of an object, recognize the object and/or analyze the object. These systems are in use in numerous applications, including, but not limited to, remote locations, locations observing moving equipment, locations with a small area or a reduced clearance for a human observer, locations of unpredictable or extreme weather conditions, locations of low ambient light, and/or locations in which a human observer is not practicable. Typically, these machine vision systems may include a single camera or, in a stereo vision application, utilize at least two cameras.

In a single camera machine vision system application, an image is captured and segmented. The object(s) or scene(s) of the image is subsequently analyzed based upon changes in the intensity of the image. This may include the recognition and/or measurement of the dimensions of the object(s) and/or scene(s) in the image. For example, edges and/or regions of the object(s) or scene(s) of the image are detected based upon changes in image intensity.

However, vision system applications based on image intensity have limitations. Notably, intensity changes in the image do not always occur at a discontinuity in depth of the object(s) or scene(s), Accordingly, the vision systems utilizing changes in intensity often do not reflect the true structure of the scene(s) or the true detail of the object(s). The resulting image analysis leads to false or inaccurate results.

In a stereo machine vision system application, at least two cameras are provided at a known geometry from one or more object(s) or scene(s). The cameras concurrently or simultaneously capture separate images of the same object(s) or scene(s). The object(s) or scene(s) of the images are subsequently analyzed based upon disparities between the images. This analysis may include recognizing and or measuring the dimensions of the object(s) and/or scene(s) in the images. For example, the images are analyzed to establish corresponding points of the object(s) and/or scene(s) on the separate images. The depth of the object(s) and/or scene(s) in the images can subsequently be ascertained through further analysis, including through algorithms which consider the disparities between the corresponding points and the known geometry of the cameras in relation to the object(s) or scene(s). The depth information. allows the vision system application to recognize and/or measure the dimensions of the object(s) and/or scenes) in the images.

However, vision system applications based on multiple image analysis through corresponding points have limitations. For example, in order to obtain information from multiple images, the corresponding points of the images must he correctly matched. However, matching of the images can be very difficult, and at times impossible, due to a number of factors, including, occlusions in one or multiple images and/or improper or inaccurate assumptions in the algorithms for matching. If the images are not matched, information from the images cannot be ascertained. Further, the algorithms for analyzing images work effectively in controlled environments, such as laboratory conditions. However, in uncontrolled environments, such as industrial applications, these algorithms generate errors and inconsistencies in the matching and analysis of images due to factors including, but not limited to, changing lighting conditions, changing background conditions, environmental interferences adding noise to an image, and/or moving, object(s). Further, the geometry and spatial relationship of the cameras must be constant in order to correctly reconstruct and analyze an image. However, the geometry and spatial relationship of the cameras can be difficult to maintain in some industrial applications, for example in railway applications. Vibration, movement of the rail, and/or movement of the ties on the rail ballast can adversely change the geometry and spatial relationship of the cameras, leading to an inaccurate analysis of the images.

In addition, known systems struggle with small depth discontinuities. For example, known systems overlook or fail to identify small depth discontinuities, as small depth discontinuities may have a texture or color in the foreground which is similar to the background. Likewise, for example, known systems detect patterns on a planar surface which do not reflect the true boundaries of an object. Both of these instances in known systems result in false or inaccurate results.

SUMMARY

The present invention relates to a machine vision system and associated method of use which effectively and reliably recognizes and analyzes images in an industrial application. In addition, the disclosed image acquisition and analysis system helps overcome some or all of such various sources of error which lead to inaccurate results.

More specifically, the present invention relates to a machine vision system comprising a camera, a first lighting unit in communication with the camera and adapted to emit light of a first range of wavelengths in synchronization with operation of the camera; and a second lighting unit in communication with the camera and adapted to emit light of a second range of wavelengths In synchronization with operation of the camera; wherein the first range of wavelengths does not overlap the second range of wavelengths.

The present invention farther relates to an image acquisition system comprising a camera assembly; and a flash unit assembly in communication with the camera assembly and adapted to emit light of a first wavelength and light of a second wavelength concurrently in synchronization with operation of the camera assembly; wherein the first wavelength does not overlap the second wavelength.

The present invention further relates to a machine vision system for acquiring an image comprising a camera provided a first distance from an object; a first flash unit in operable communication with the camera, and provided a second distance from the object, wherein the first flash unit is adapted to emit light of one or more first wavelengths in synchronization with operation of the camera; and a second flash unit in operable communication with the camera, and provided a third distance from the object, wherein the second flash unit is adapted to emit light of one or more second wavelengths in synchronization with operation of the camera and concurrently with the light emitted by the first flash unit; wherein the one or more first wavelengths do not overlap the one or more second wavelengths, and wherein the one or more first wavelengths and the one or more second wavelengths overlap a portion of one or more third wavelengths of light.

DESCRIPTION

The invention generally relates to an image acquisition and analysis system for the acquisition and detection of image depth discontinuity from shadow implementing light sources of separate and/or nonoverlapping wavelengths. The Figures illustrate one or more examples of embodiments of the present invention. Although image acquisition and analysis system is described for use with one or more specific applications, such as a railroad or railway environment, it should be appreciated that image acquisition and analysis system may be used in any machine vision application in which image acquisition and analysis is desired and/or needed. Further, although one or more examples of embodiments of the image acquisition system may be described with reference to light Which is blue and/or light which is red in color, it should be appreciated that "blue light" and/or "red light" is provided for purposes of illustration and image acquisition system may be used in association with light of any wavelength, for example including, but not limited to, light of any color, light of a range of wavelengths, light of one or more wavelengths (e.g. a mix of wavelengths), light which is visible to the human eye, and/or light which is not visible to the human eye.

It should be appreciated that an "object" may include any stationary, semi-stationary, or moving object, item, area, or environment in which it may be desired for the image acquisition and analysis system to acquire and/or analyze an image of. For example, the object may include, but is not limited to, a portion of a railroad vehicle, railroad car, and/or railway environment. However, it should be appreciated that the image acquisition and analysis system disclosed herein may acquire and/or analyze an image of any desired or suitable "Object" in accordance with operation of system as disclosed herein.

Figure 1:
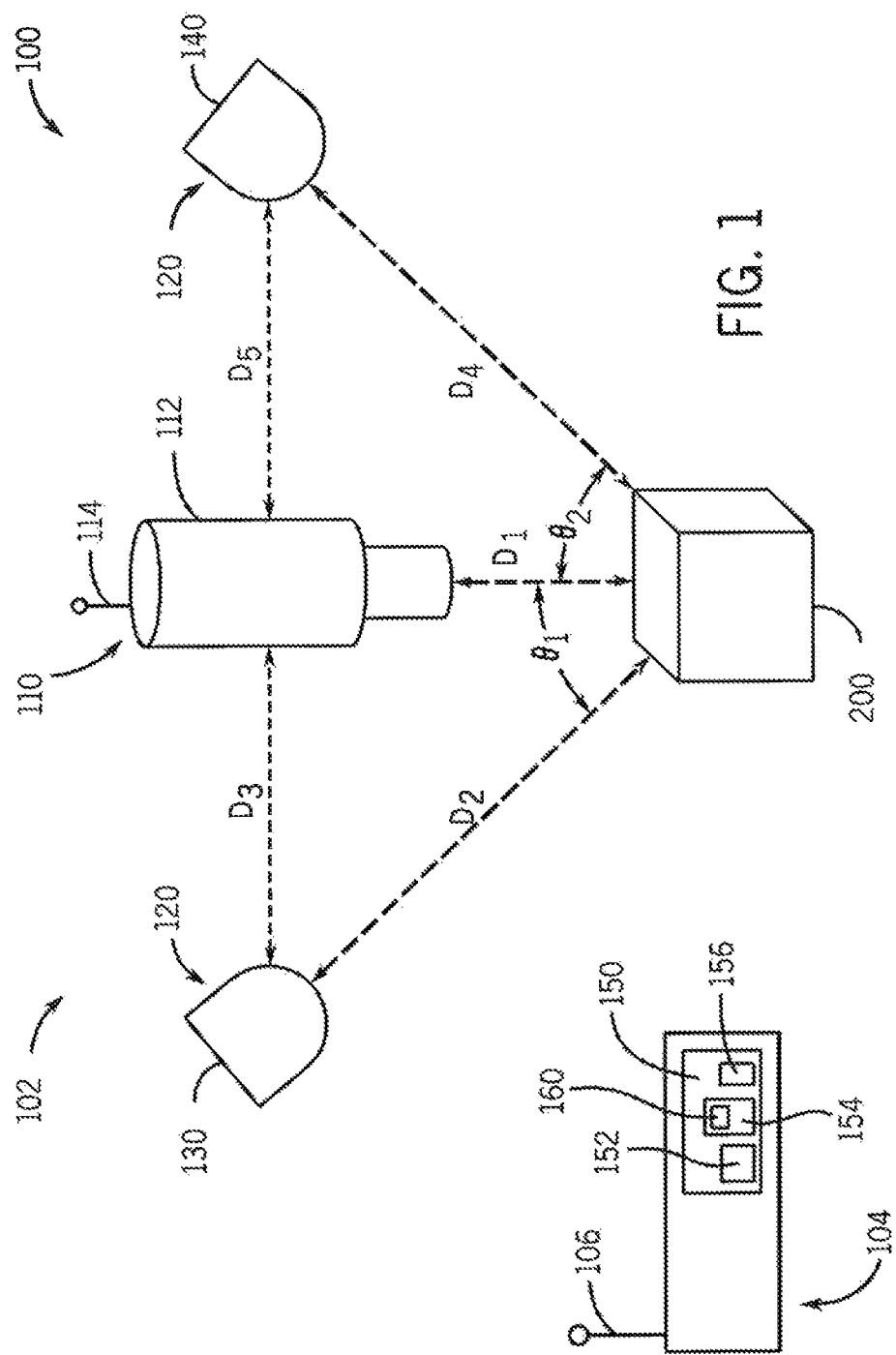
FIG. 1 is an isometric view of an image acquisition and analysis system according to one or more examples of embodiments.

FIG. 1 illustrates one or more examples of embodiments of an image acquisition and analysis system 100. Referring to FIG. 1, the image acquisition and analysis system 100 may include an image acquisition system 102. In various embodiments, image acquisition system 102 includes a camera assembly 110 and light source 120.

As illustrated in FIG. 1, in various embodiments, camera assembly 110 includes a camera or color camera 112. In various embodiments, camera 112 is provided a known first distance $D_1$ or distances from an object or objects 200. In various embodiments, camera 112 is provided approximately perpendicular to object 200. However, the camera may be provided at any angle to the object or objects. Further, in one or more examples of embodiments, the camera assembly includes two or more cameras provided at one or more locations, distances from, and/or angles to the object or objects. In one or more examples of embodiments, object 200 may be stationary or in motion. Camera 112 may be any known or future developed camera or image capturing apparatus suitable for operation with the image acquisition system as described herein.

In various embodiments, light source 120 is in communication with and/or connected to camera assembly 110. In various embodiments, light source 120 is synchronized with camera 112 of camera assembly 110 (e.g., such that light source 120 may cant one or more flashes of light about when camera 112 takes a photograph). It should be appreciated that in one or more examples of embodiments, the light source may emit one or more flashes, or periodic, continuous, or constant streams of light.

As shown in FIG. 1, in various embodiments, light source 120 includes a first lighting unit or first flash unit 130 and a second lighting unit or second flash unit 140. In various embodiments, first flash unit 130 is provided at a first location at a known second distance $D_2$ and/or at a known first angle $\theta_1$ from object 200. Further, first flash unit 130 may be provided at a known third distance $D_3$ from camera assembly 110. In various embodiments, second flash unit 140 is provided at a second location at a known fourth distance $D_4$ and/or at a known second angle $\theta_2$ from object 200. In addition, second flash unit 140 may be provided at a known fifth distance $D_5$ from camera assembly 110. In one or more examples of embodiments, the light source may include three or more lighting units or flash units provided at one or more locations, distances from the camera assembly, distances from the object, and/or angles to an object. In one or more examples of embodiments, the first flash unit or lighting unit and/or second flash unit or lighting unit may be provided at any distance from an object, any angle from an object, and/or any distance from the camera assembly in order to acquire the desired results for the image acquisition and analysis system in accordance with one or more examples of embodiments of the disclosed invention. It should be appreciated that any two or more of the first distance $D_1$, second distance $D_2$, third distance $D_3$, fourth distance $D_4$, and fifth distance $D_5$, may be identical or different. It should also be appreciated that first angle $\theta_1$ and second angle $\theta_2$ may be identical or different.

In various embodiments, image acquisition system 102 is in communication with an analysis system 1.04. For example, as illustrated in FIG. 1, in various embodiments, analysis system 104 includes a communication terminal 106. In various embodiments, communication terminal 106 is adapted to communicate with a camera communication terminal 114, providing a communication link for transmission of information between image acquisition system 102 and analysis system 104. In one or more examples of embodiments, communication terminal, camera communication terminal, and the associated communication link may be any known or future developed communication device suitable for the transmission of information, including, but not limited to, wired, wireless, ethernet, and/or universal serial bus (USB).

In various embodiments, analysis system 104 includes a programmable computer system 150 having random access memory (RAM) 152, a computer readable storage medium or storage device or hard drive 154, and a processor 156. In various embodiments, programmable computer system 150 stores and/or carries an image analysis application 160, for example in association with hard drive 154. Further, a user may employ programmable computer system 150 to manually operate image acquisition system 102 of image acquisition and analysis system 100. In one or more examples of embodiments, the programmable computer system may be any known or fixture developed programmable computer processor system suitable to store data and operate the image analysis application. Further, in one or more examples of embodiments, the computer readable storage medium may include any data storage device which can stoic data that can be thereafter read by a computer system. Examples of computer readable medium may include read-only memory, CD-ROM, CD-R, CD-RW, DVD, DVD-RW, magnetic tapes, Universal Serial Bus (USB) flash drive, or any other optical or other suitable data storage device. The computer readable medium may also he distributed over a network coupled or in communication with the programmable computer system so that the computer readable code or application, including the image analysis application, is stored and executed in a distributed fashion.

Figure 2:
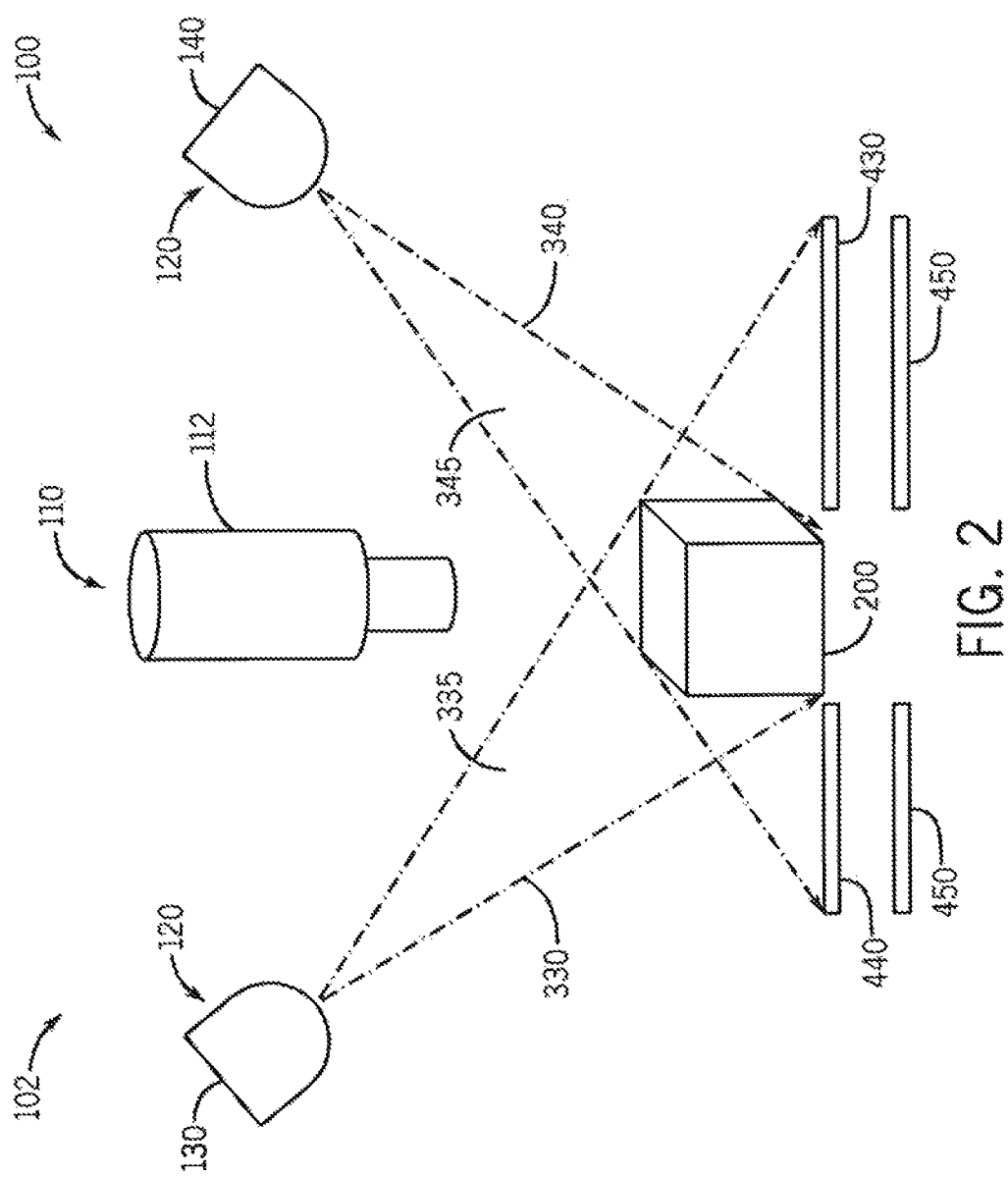
FIG. 2 is an isometric view of the image acquisition and analysis system of FIG. 1, illustrating an example of operation of the system.

Referring now to FIG. 2, in various embodiments, first flash unit 130 emits light of a first wavelength or range of wavelengths 330. As illustrated in FIG. 2, in various embodiments, first flash unit 130 emits light of a first wavelength 330 in a first light plane or light beam 335. In various embodiments, first light beam 335 is directed or otherwise provided to illuminate object 200 and may cast a first shadow 430. In one or more examples of embodiments, the light of a first wavelength 330 has a wavelength corresponding to light which is blue in color, and accordingly may cast a blue shadow 430. It should be appreciated, however, that the light of a first wavelength may correspond to any light, including, but not limited to, light of any color, any light visible to the human eye, any light not visible to the human eye, and/or light of any wavelength. Further, in one or more examples of embodiments, the light of a first wavelength may be light of a single wavelength, light of a range of wavelengths, or light of two or more wavelengths (e.g. a mix of wavelengths). In one or more examples of embodiments, the image acquisition system may include a plurality of first flash units emitting light of a first wavelength, range of wavelengths, and/or different wavelengths provided at one or more locations, distances from the camera assembly, distances from the object, and/or angles to the object.

In various embodiments, second flash unit 140 emits light of a second wavelength or range of wavelengths 340. In various embodiments, light of a second wavelength or range of wavelengths 340 is of a different wavelength or range of wavelengths which is separate, distinct and/or does riot overlap the wavelength(s) of the light of a first wavelength or range of wavelengths 330. As illustrated in FIG, 2, in various embodiments, second flash unit 140 may emit light of a second wavelength 340 in a second light plane or light beam 345. In various embodiments, second light beam 345 is directed or otherwise provided to illuminate object 200 and may cast a second shadow 440, For example, in one or more examples of embodiments, light of a second wavelength 340 has a wavelength corresponding to light which is red in color, and accordingly may cast a red shadow 440. In various embodiments, the light emitted by the second flash unit is of a second wavelength or range of wavelengths which is separate, distinct and does not overlap the first wavelength(s) of light emitted by the first flash unit. Otherwise, it should be appreciated, however, that the light of a second wavelength may correspond to any light, including, but not limited to, light of any color, any light visible to the human eye, any light not visible to the human eye, and/or light of any wavelength. Further, in one or more examples of embodiments, the light of a second wavelength may be light of a single wavelength, light of a range of wavelengths, or light of two or more wavelengths (e.g. a mix of wavelengths). In one or more examples of embodiments, the image acquisition system may include a plurality of second flash units emitting light of a second wavelength, range of wavelengths, and/or different wavelengths provided at one or more locations, distances nom the camera assembly, distances from the object, and/or angles to the object. In one or more examples of embodiments, the image acquisition system may include one or more additional flash units emitting light of a wavelength different from and not overlapping with the light of the first and second flash units.

A third shadow 450 may be present or cast when, in various embodiments, light of a first wavelength 330 and light of a second wavelength 340 are emitted, directed or otherwise provided toward object 200. Third shadow 450 may be associated with light of a third wavelength 350. Light of a third wavelength 350 may be of a frequency spectrum which overlaps light of a first wavelength 330 and light of a second wavelength 340. As such, light of a third wavelength 350, and associated third shadow 450, may be present when both light of a first wavelength 330 and light of a second wavelength 340 are emitted toward object 200.

Figure 3:
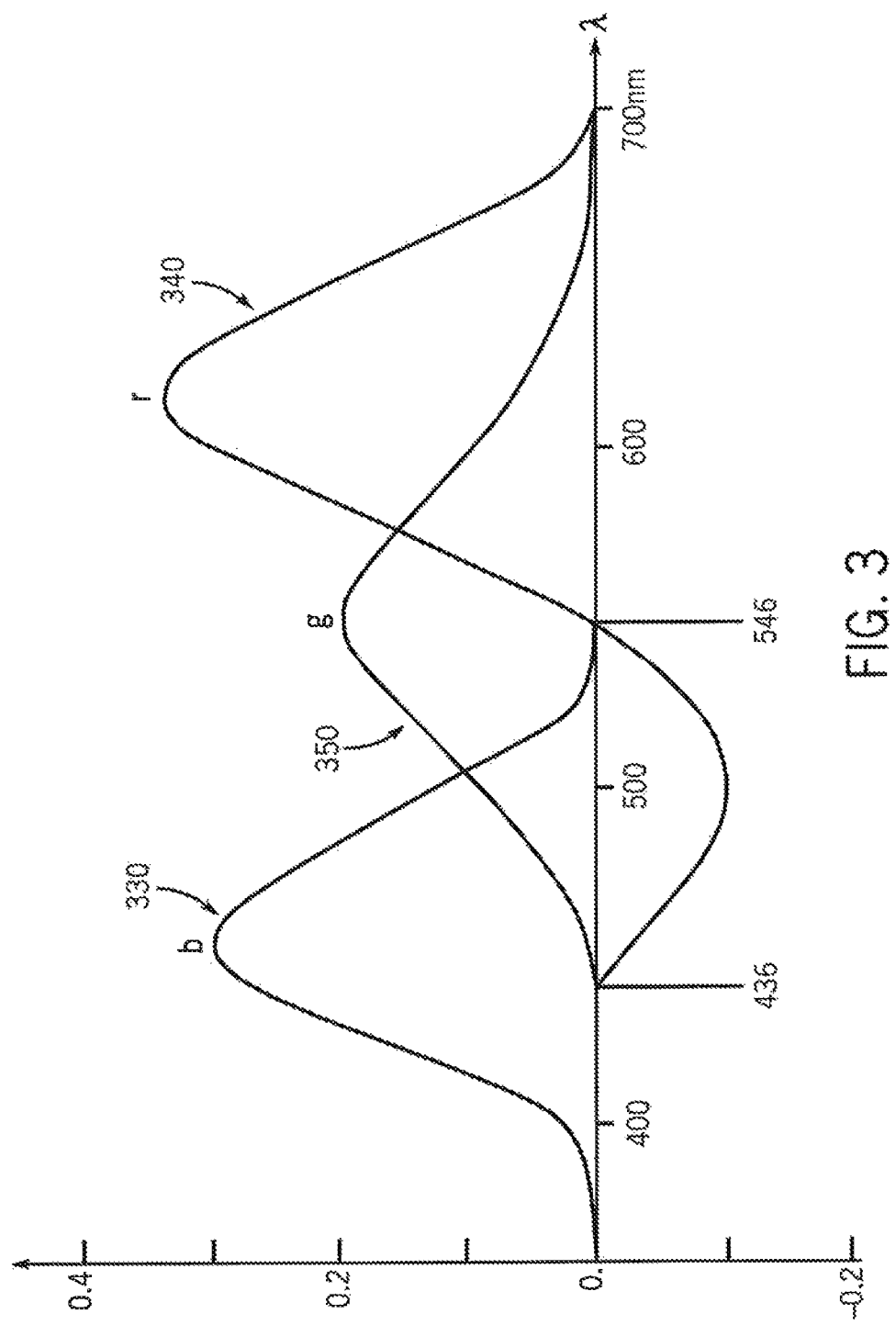
FIG. 3 is a graph illustrating one of more examples of the wavelength of light emitted from the system of FIG. 1.
Figure 4:
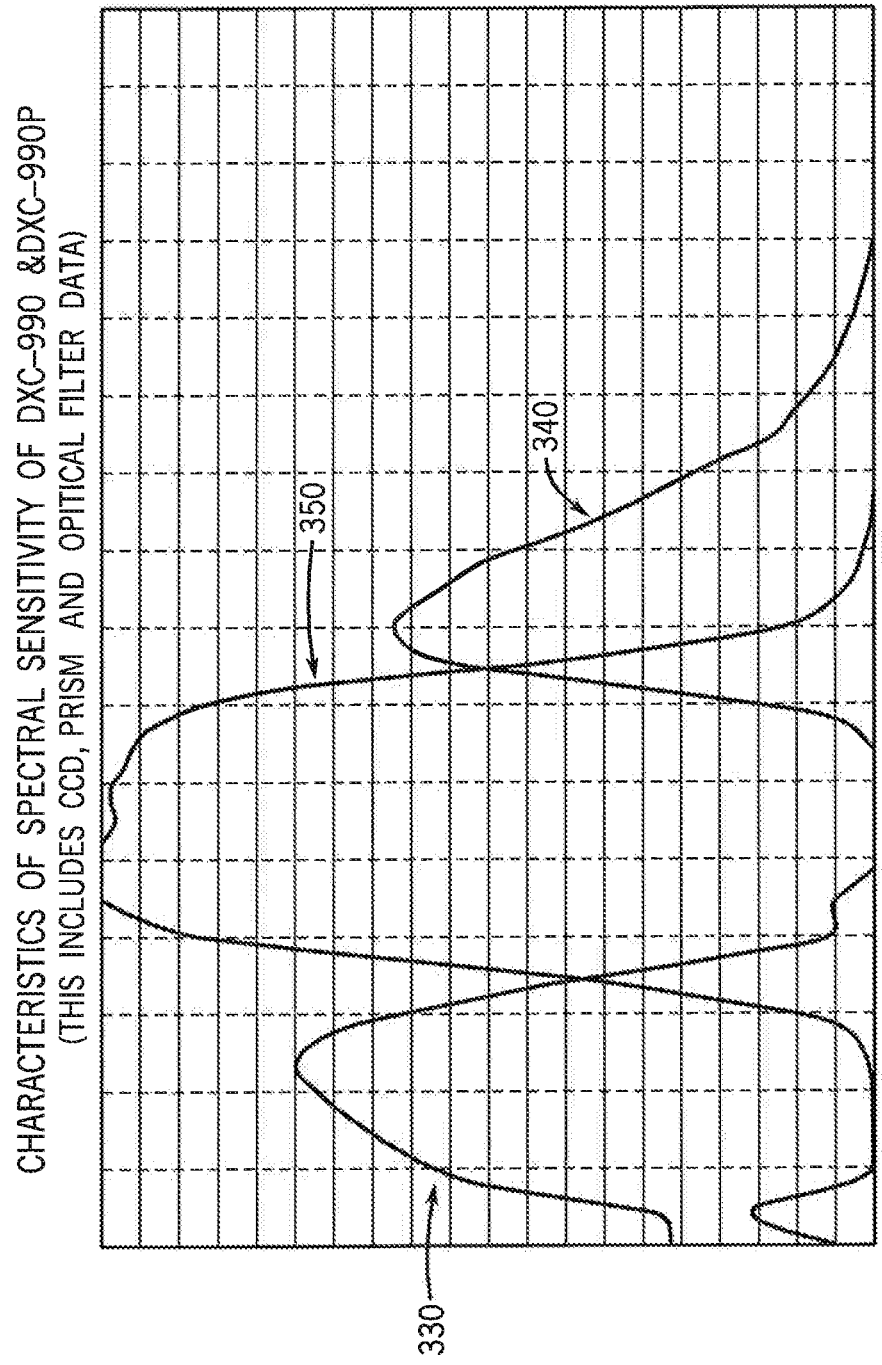
FIG. 4 is a graph illustrating the spectral characteristics of a camera used in or more examples of embodiments of the system of FIG. 1.

FIG. 3 illustrates an International Commission on Illumination (CIE) color matching graph showing the wavelength of visible light, λ, in nanometers (X-axis), versus the intensity of light (Y-axis) for light of various colors, including blue (b), green (g), and red (r). FIG. 4 illustrates an example of spectral characteristics of light of a color camera.

As shown in FIGS. 3 and 4, in various embodiments, light of a first wavelength 330 has wavelengths which are separate or distinct from light of a second wavelength 340. Based upon spectral characteristics, in various embodiments, there is little if an cross color components between light of a first wavelength 330 and light of a second wavelength 340. Thus, in various embodiments, light of a first wavelength 330 does not include a wavelength which overlaps with light of a second wavelength 340. However, in various embodiments, light of a first wavelength 330 and/or light of a second wavelength 340 may each overlap light of a third wavelength or range of wavelengths 350.

For example, referring to the examples illustrated in FIGS. 3 and 4, in various embodiments, light of a first wavelength 330, which is illustrated as light which is blue in color (b), has separate wavelengths from light of a second wavelength 340, which is illustrated as light which is red in color (r). Accordingly, in various embodiments, light of a first wavelength 330 does not overlap light of a second wavelength 340. Light of a first wavelength 330 and light of a second wavelength 340 may overlap light of a third wavelength 350, which is illustrated as light which is green in color (g). For example, as shown in FIGS. 3 and 4, light of a first wavelength 330 may overlap light of a third wavelength 350 at the lower wavelengths of light of third wavelength 350. Light of a second wavelength 340 may overlap light of a third wavelength 350 at the upper or higher wavelengths of light of a third wavelength 350.

In operation and use, image acquisition system 102 of image acquisition and analysis system 100 illuminates and photographs an object 200. Referring to FIG. 2, in various embodiments, object 200 is provided. In various embodiments, camera assembly 110 is provided to photograph object 200. In various embodiments, as camera 112 operates or activates to photograph object 200, first flash unit 130 emits light of a first wavelength 330 directed towards object 200 in a first light beam 335. In various embodiments, light of a first wavelength 330 illuminates at least a portion of object 200. Further, light of a first wavelength 330 may cast a first shadow 430 at a depth discontinuity of the object in a direction based upon the arrangement of first flash unit 130 to object 200. In various embodiments, second flash unit 140 may concurrently or simultaneously emit light of a second wavelength 340 directed towards object 200 in a second light beam 345. In various embodiments, the light of a second wavelength 340 illuminates at least a portion of object 200. Further, light of a second wavelength 340 may cast a second shadow 440 at a depth discontinuity of object 200 in a direction based upon the arrangement of second flash unit 140 to object 200.

In various embodiments, camera 112 takes a photograph or acquires or captures an image (e.g. color image) of object 200. In various embodiments, the color image is separated into three independent monochrome image planes of object 200. In various embodiments, the three monochrome image planes respectively include a light of a first wavelength image plane, a light of a second wavelength image plane, and a light of a third wavelength image plane, wherein the light of a third wavelength 350 overlaps a portion of light of a first wavelength 330 and a portion of light of a second wavelength 340. The image of the first wavelength image plane may show object 200 illuminated with the light of a first wavelength 330, and may include a first shadow 430 at a depth discontinuity. The image of the second wavelength image plane may show object 200 illuminated with the light of a second wavelength 340, and may include a second shadow 440 at a depth discontinuity. The image of the third wavelength image plane may show object 200 illuminated with both light of a first wavelength 330 and light of a second wavelength 340, as the wavelength of the light of a third wavelength 350 may overlap both light of a first wavelength 330 and light of a second wavelength 340. Further, the image of the third wavelength image plane may include third shadow 450 at any depth discontinuity photographed in the first wavelength image plane and/or second wavelength image plane, respectively. Third shadow 450 of the third wavelength image plane may be less intense then first shadow 430 and/or second shadow 440 of the respective first wavelength image plan(and/or second wavelength image plane.

The three monochrome image planes captured by image acquisition system 102 may be subsequently analyzed by analysis system 104 of the image acquisition and analysis system 100. For example, in various embodiments, the image of the first wavelength image plane, the image of the second wavelength image plane and the image of the third wavelength image plane are cross referenced and analyzed by analysis system 104. Analysis system 104 may analyze and cross reference the three monochrome image planes, or the image of the first wavelength image plane, the image of the second wavelength image plane, and/or the image of the third wavelength image plane, to determine and evaluate the shadows and the shadowed edges. In various embodiments, the shadows indicate a depth change occurring in the image edge pixels, and the orientation of the depth change. In various embodiments, analysis of the shadows and shadowed edges provides information about object 200. For example, edges of the object image with structured shadows or sharp depth changes, referred to as depth edges, may provide a more realistic and accurate scene segmentation. Further, the width of the shadow may imply depth information in the depth edge. The relative depth of the shadowed edge of the object may be calculated according to geometrical information, including, for example, the geometrical relationship between camera 112, flash unit(s) 130, 140 and object 200. In various embodiments, calculating the depth of the shadowed edge provides a system to construct a quantitative depth map of the photographed object 200 and/or scene. This may advantageously provide a system for the detection of defects (e.g. cracks) in an object 200.

To further illustrate operation and use of image acquisition and analysis system 100, the following provides an example of system 100 implementing certain wavelengths and/or colors of light. The associated light is provided for example only, and is not meant to be limiting in any way. Any number, range, or wavelengths of light may be implemented with system 100 in accordance with the description provided herein.

As an example, in various embodiments, when camera 112 activates to photograph object 200, first flash unit 130 emits light of a first wavelength 330 (e.g. light having a wavelength or range of wavelengths associated with blue light) directed towards object 200 in a first light beam 335 (e.g. blue light beam). In various embodiments, the light of a first wavelength 330 (e.g. blue light) illuminates at least a portion of object 200. Light of a first wavelength 330 (e.g. blue light) may cast a first shadow 430 (e.g. blue shadow) at a depth discontinuity of the object in a direction based upon the arrangement of first flash unit 130 to object 200. Concurrently or simultaneously, in various embodiments, second flash unit 140 emits light of a second wavelength 340 (e.g. light having a wavelength or range of wavelengths associated with red light) directed towards object 200 in a second light beam 345 (e.g. red light beam). In various embodiments, the light of a second wavelength 340 (e.g. red light) illuminates at least a portion of object 200. Further, light of a second wavelength 340 (e.g. red light) may cast a second shadow 440 (e.g. red shadow) at a depth discontinuity of object 200 in a direction based upon the arrangement of second flash unit 140 to object 200.

The three monochrome image planes may include a blue image plane, a red image plane and a green image plane. However, as discussed above other embodiments may capture image planes of different light wavelengths and/or colors. In various embodiments, the image of the first wavelength image plane (e.g. blue image plane) may show object 700 illuminated with light of a first wavelength 330 (e.g. blue light), and may include first shadow 430 (e.g. a blue shadow) at a depth discontinuity. In various embodiments, the linage of the second wavelength image plane (e.g. red image plane) may show object 200 illuminated with the light of a second wavelength 340 (e.g. red light), and may include second shadow 440 (e.g. red shadow) at a depth discontinuity. In various embodiments, the image of the third wavelength image plane (e.g. green image plane) may show object 200 illuminated with both the light of a first wavelength 330 (e.g. blue light) and the light of a second wavelength 340 (e.g. red light), as the wavelength of the light of a third wavelength 350 (e.g. green light) may overlap with both light of a first wavelength 330 (e.g. blue light) and light of a second wavelength 340 (e.g. red light) (see FIGS. 3 and 4). In addition, the image of the third wavelength image plane (e.g. green image plane) may include third shadow 450 (e.g. green shadow) at any depth discontinuity photographed in the first wavelength image plane (e.g. blue image plane) and/or second wavelength image plane (e.g. red image plane), respectively. In various embodiments, third shadow 450 (e.g. green shadow) of the third wavelength image plane (e.g. green image plane) may be less intense then first shadow 430 (e.g. blue shadow) and/or second shadow 440 (e.g. red shadow) of the respective first wavelength image plane (e.g. blue image plane) and/or second wavelength image plane (e.g. red image plane).

The three monochrome image planes captured by image acquisition system 102 may be subsequently analyzed by analysis system 104 of the image acquisition and analysis system 100. For example, in various embodiments, the image of the first wavelength image plane (e.g. blue image plane), the image of the second wavelength image plane (e.g. red image plane) and the image of the third wavelength image plane (e.g. green image plane) are cross referenced and analyzed by analysis system 104. Analysis system 104 may analyze and cross reference the three monochrome image planes, or the image of the first wavelength image plane (e.g. blue image plane), the image of the second wavelength image plane (e.g. red image plane) and/or the image of the third wavelength image plane (e.g. green image plane), to determine and evaluate the shadows and the shadowed edges. In various embodiments, the shadows indicate a depth change occurring in the image edge pixels, and the orientation of the depth change. In various embodiments, the analysis of the shadows, and shadowed edges provides information about object 200. For example, edges of the object image with structured shadows or sharp depth changes, referred to as depth edges, may provide a more realistic and accurate scene segmentation. As another example, the width of the shadow may imply depth information in the depth edge. In various embodiments, the relative depth of the shadowed edge of the object may be calculated according to geometrical information, including the geometrical relationship between camera 112, flash unit(s) 130, 140 and object 200. In various embodiments, calculating the depth of the shadowed edge provides a system to construct a quantitative depth map of the photographed object 200 and/or scene. This may advantageously provide a system for the detection of defects (e.g. cracks) in object 200.

There are several advantages to the disclosed image acquisition and analysis system. In various embodiments, small depth discontinuities are enhanced by shadows from light emitted by the flash unit assembly. Further, depth edges may be distinguished from planar patterns through structured shadows. In addition, in various embodiments, the disclosed image acquisition and analysis system does not require a matching algorithm for analyzing the multiple monochrome image planes. In various embodiments, the same spatial points are projected onto the same pixels of the three monochrome image planes. This is because, in various embodiments, the three monochrome image planes are taken from a color image captured with a single camera at a single point in time. This may help eliminate a significant source of inaccuracies in processing and analyzing images in a stereo vision application. Further, in various embodiments, the disclosed image acquisition and analysis system has greater versatility and requires less space than known systems. Because the three monochrome image planes are captured with a single camera, the image acquisition system may be smaller in size and/or more rigid than a stereo vision application utilizing a minimum of two cameras. In addition, in various embodiments, the disclosed image acquisition and analysis system can be customized for specific applications. For example, the camera assembly and flash units of the flash unit assembly may be positioned and/or oriented to produce more effective depth edge detection and scene segmentation from structured shadows. In addition, in various embodiments, the disclosed image acquisition and analysis system provides image object segmentation, coarse estimation of the depth associated with depth edges and accurate measurement of the dimensions of an object. Further, in various embodiments, the disclosed image acquisition and analysis system provides accurate quantitative analysis along the depth edges and provides a system to construct a depth map of an object and/or scene when the geometrical information of the image system, for example the geometry and spatial relationship of the camera, flash unit(s), and object and/or scene, is known.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Aspects of the image analysis application described herein can be implemented on software running on a computer system. The system herein, therefore, may be operated by computer-executable instructions, such as program modules, executable on a computer. Program modules may include routines, programs, objects, components, data structures and the like which perform particular tasks or implement particular instructions. The software program may be operable for supporting the transfer of information within a network of trusted partner sites using artifacts.

The computers for use with the system and various components described herein may be programmable computers which may be special purpose computers or general purpose computers that execute the system according to the relevant instructions. The computer system can be an embedded system, a personal computer, notebook computer, server computer, mainframe, networked computer, handheld computer, personal digital assistant, workstation, and the like. Other computer system configurations may also be acceptable, including, cell phones, mobile devices, multiprocessor systems, microprocessor-based or programmable electronics, network PC's, minicomputers, and the like. Preferably, the computing system chosen includes a processor suitable in size to efficiently operate one or more of the various systems or functions.

The system or portions thereof may also be linked to a distributed computing environment, were tasks are performed by remote processing, devices that are linked through a communications network. To this end, the system may be configured or linked to multiple computers in a network, including, but not limited to a local area network, a wide area network, a wireless network, and the Internet. Therefore, information and data may be transferred within the network or system by wireless means, by hardwire connection or combinations thereof.

The computer can also include a display, provision for data input and output, etc. Furthermore, the computer or computers may be operatively or functionally connected to one or more mass storage devices, such as, but not limited to a database. The memory storage can be volatile or non-volatile and can include removable storage media. The system may also include computer-readable media which may include any computer readable media or medium that may be used to carry or store desired program code that may be accessed by a computer. The invention can also be embodied as computer readable code on a computer readable medium. To this end, the computer readable medium may be any data storage device that can store data which can be thereafter read by a computer system. Examples of computer readable medium include read-only memory, random-access memory, CD-ROM, CD-R, CD-RW, magnetic tapes, and other optical data storage devices. The computer readable medium can also be distributed over a network coupled computer system so that the computer readable code is stored and executed in a distributed fashion.

Although various representative examples of embodiments of this invention have been described above with a certain degree of particularity, those skilled in the art could make numerous alterations to the disclosed embodiments without departing from the spirit or scope of the inventive subject matter set forth in the specification and claims. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A machine vision system comprising:
a camera;
a first lighting unit in communication with the camera, the first lighting unit provided at a first position and adapted to emit light of a first range of wavelengths in synchronization with operation of the camera to illuminate at least a portion of the object and cast a first shadow;
a second lighting unit in communication with the camera, the second lighting unit provided at a second position and adapted to emit light of a second range of wavelengths in synchronization with operation of the camera and concurrently with emission of light from the first lighting unit to illuminate at least a portion of the object and cast a second shadow and, in combination with the first lighting unit, a third shadow; and
an analysis system in communication with the camera;
wherein the first range of wavelengths does not overlap the second range of wavelengths; and
wherein the camera is adapted to capture, in single multi-colored image, at least a portion of the object, at least a portion of the first shadow, and at least a portion of the second shadow and at least a portion of the third shadow; and
wherein the analysis system is adapted to analyze at least three independent monochrome image planes taken from said multi-colored image to determine depth edges and discontinuities of the object.

2. The machine vision system of claim 1 wherein the light of the first range of wavelengths is a first color of light.

3. The machine vision system of claim 2 wherein the first color of light is blue light.

4. The machine vision system of claim 1 wherein the light of the second range of wavelengths is a second color of light.

5. The machine vision system of claim 4 wherein the second color of light is red light.

6. The machine vision system of claim 1 wherein the camera is a color camera.

7. The machine vision system of claim 1 wherein the first lighting unit emits a flash of light of the first range of wavelengths in synchronization with operation of the camera.

8. The machine vision system of claim 7 wherein the second lighting unit emits a flash of light of the second range of wavelengths in synchronization with operation of the camera.

9. The machine vision system of claim 1 wherein the first lighting unit emits a continuous source of light of the first range of wavelengths.

10. The machine vision system of claim 9 wherein the second lighting unit emits a continuous source of light of the second range of wavelengths.

11. An image acquisition system comprising:
a camera assembly; and
a flash unit assembly provided at a first position relative to an object, the flash unit assembly in communication with the camera assembly and adapted to concurrently emit light of a first wavelength and light of a second wavelength in synchronization with operation of the camera assembly to illuminate at least a portion of the object and cast a first shadow corresponding to the light of the first wavelength, a second shadow corresponding to the light of the second wavelength, and a third shadow corresponding to both the light of the first wavelength and the second wavelength; and
an analysis system in communication with the camera assembly;
wherein the first wavelength does not overlap the second wavelength; and
wherein the camera assembly is adapted to capture, in a single multi-colored image, at least a portion of the object, at least a portion of the first shadow, at least a portion of the second shadow, and at least a portion of the third shadow; and
wherein the analysis system is adapted to analyze at least three independent monochrome image planes respectively comprising the light of the first wavelength, the light of the second wavelength and the light of the third wavelength, to determine depth edges and discontinuities of the object.

12. The image acquisition system of claim 11, wherein the camera assembly includes a plurality of cameras.

13. The image acquisition system of claim 11, wherein the flash unit assembly includes a first flash unit and a second flash unit.

14. The image acquisition system of claim 13, wherein the first flash unit emits the light of the first wavelength.

15. The image acquisition system of claim 14, wherein the second flash unit emits the light of the second wavelength.

16. The image acquisition system of claim 15, wherein the light of the first wavelength is in the range of wavelength of light blue in color and the light of the second wavelength is in the range of wavelength of light red in color.

* * * * *